Sept. 10, 1968  A. M. LUECK  3,400,687
FILM THICKNESS MONITORING APPARATUS
Filed Feb. 25, 1966  2 Sheets-Sheet 1
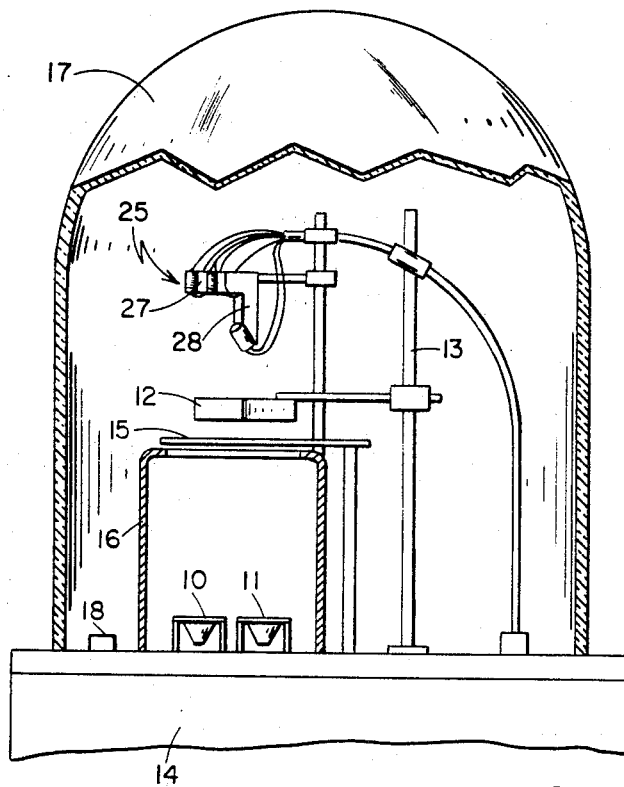
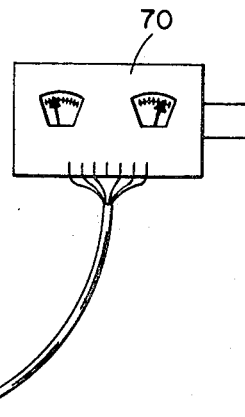
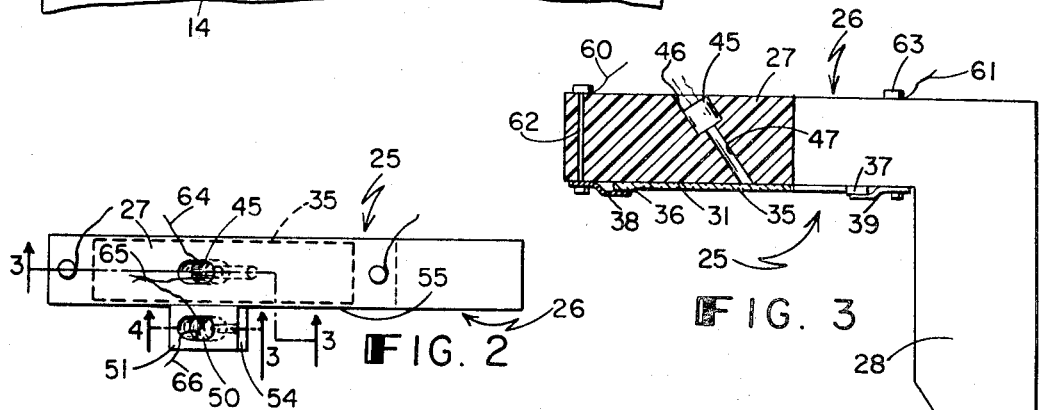
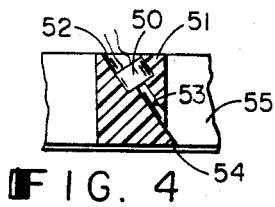
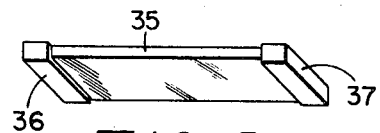
INVENTOR.
ARTHUR M. LUECK
BY David M. Keay
AGENT.

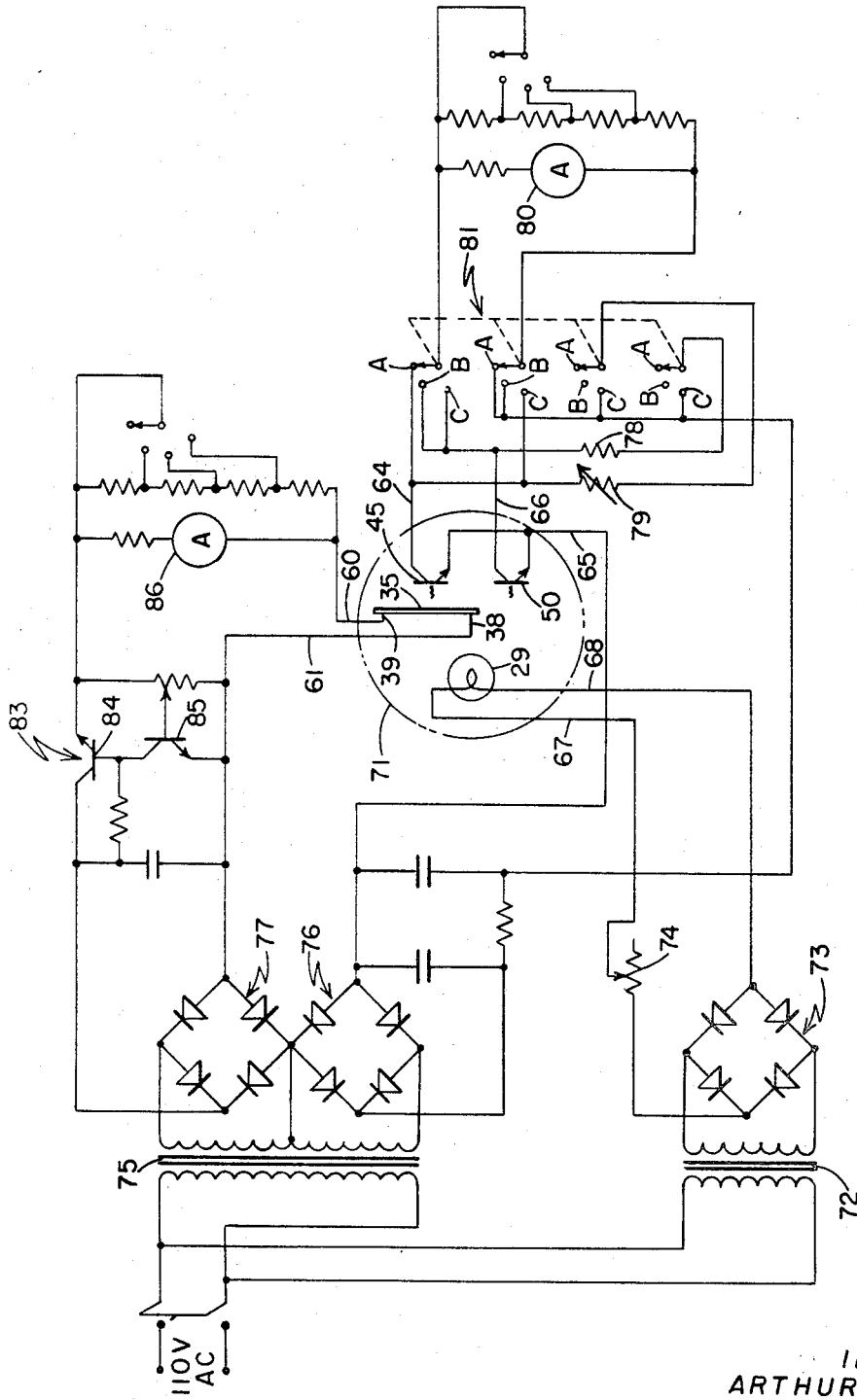

3,400,687
FILM THICKNESS MONITORING APPARATUS
Arthur M. Lueck, Chelmsford, Mass., assignor to
Sylvania Electric Products Inc., a corporation of
Delaware
Filed Feb. 25, 1966, Ser. No. 530,190
5 Claims. (Cl. 118—9)

This invention relates to film thickness monitoring apparatus. More particularly, it is concerned with apparatus for determining the thickness of deposited films for use in conjunction with equipment for depositing films of material on a substrate.

Deposition equipment in which material is transferred from a source of material by evaporation or similar processes and deposited as a thin film on a substrate are widely used. It is frequently important to determine accurately the thickness of deposited material. In many instances it is important that the thickness of a film being deposited be monitored continually during the deposition procedure so that the thickness or rate of deposition may be accurately controlled by appropriate operation of the equipment.

Various types of film thickness measuring apparatus making use of various characteristics of the deposited material which vary with thickness have been developed. However, types of apparatus which are satisfactory for measuring thicknesses over a wide range, from the order of a few hundred angstrom units to tens of thousands of angstrom units, are complex and expensive. Furthermore, with many types of measuring apparatus it is particularly difficult to monitor accurately the deposition of two or more materials in succession.

It is an object of the present invention, therefore, to provide an improved apparatus for determining the thickness of deposited films.

It is another object of the invention to provide an improved apparatus for continuously monitoring the thickness of material being deposited which is simple and inexpensive and provides accurate determination over a wide range of thicknesses.

Measuring apparatus in accordance with the foregoing objects of the invention is particularly useful in conjunction with deposition equipment in which material is transferred from a source of material and deposited on a substrate. The measuring apparatus includes a transparent pilot substrate which is adapted to receive on one surface material emanating from the source of material. A source of radiant energy, such as an incandescent lamp, is disposed on one side of the pilot substrate and means for sensing the radiant energy is disposed on the opposite side of the pilot substrate so as to sense radiant energy passing through the pilot substrate. The sensing means produces a signal which is indicative of the amount of radiant energy which reaches the sensing means. The apparatus also includes spaced-apart electrical connections which contact the one surface of the pilot substrate. A first indicating means produces an indication of the signal produced by the means for sensing the radiant energy, and a second indicating means produces an indication of the electrical resistance between the spaced-apart electrical connections.

While the film being deposited is relatively thin, the measuring apparatus of the invention permits the thickness of the film on the pilot substrate to be determined by measuring the amount of light transmitted through the film. Generally, a film which is sufficiently thin to transmit a significant amount of light has electrical resistance which is too high to enable accurate correlation to be made between resistance and film thickness. When the deposited film becomes thick enough so that the amount of light transmitted through the film can no longer be measured with the precision necessary to determine the thickness of the film with the desired accuracy, the electrical resistance of the film has decreased to values that can be measured and which provide an accurate correlation with thickness.

Additional objects, features, and advantages of measuring apparatus according to the invention will be apparent from the following detailed discussion and the accompanying drawings wherein:

FIG. 1 is an elevational view, partly in section, of vacuum deposition equipment employing measuring apparatus according to the invention, FIG. 2 is a top view of the sensing head of the measuring apparatus of the invention, FIG. 3 is an elevational view of the sensing head taken in section along line 3—3 of FIG. 2 and having portions broken away, FIG. 4 is an elevational view of a portion of the sensing head of FIG. 2 taken in section along line 4—4 of FIG. 2, FIG. 5 is a perspective view of a pilot substrate employed in the sensing head of the measuring apparatus of the invention, and FIG. 6 is a schematic circuit diagram of the electrical elements of the measuring apparatus.

The thin film vacuum deposition equipment of FIG. 1 includes containers or boats 10 and 11 for holding material to be evaporated and deposited on a substrate mounted on a substrate holder 12 which is attached to a support 13 fixed to the base 14 of the equipment. The containers 10 and 11 are suitably heated, as by passing electrical current therethrough, to vaporize the material in the containers. A shutter 15 interposed between the containers 10 and 11 and the substrate holder 12 may be moved out of the path of vaporized material emanating from the containers by a control means (not shown). A shield 16 protects some portions of the equipment from unwanted deposition of material. A bell jar 17 is placed on the base 14 to form a hermetic seal thereto and to provide a closed chamber surrounding various elements of the equipment. Air is evacuated from the chamber through an outlet 18 which is connected to a suitable vacuum pump system (not shown).

Positioned within the vacuum chamber is the sensing head 25 of the film thickness measuring apparatus according to the invention. Details of the sensing head are best seen in FIGS. 2, 3, and 4. The active elements of the sensing head are mounted in an L-shaped support 26 having a horizontally extending arm 27 and a vertically extending arm 28. A small incandescent lamp 29 is mounted at the lower end of the vertically extending arm 28 and is shielded from material emanating from the material sources by a protective shield 30. Light from the lamp is directed toward the lower, flat, horizontal surface 31 of the horizontally extending arm 27.

A pilot substrate 35 is removably mounted on the lower surface 31 of the horizontally extending arm 27. The pilot substrate, which is shown in detail in FIG. 5, is a flat rectangular plate of a transparent non-conductive material, such as, for example, glass. The end regions of the glass plate are coated with conductive material 36 and 37 leaving a non-conductive surface region of predetermined width and length on the bottom surface of the glass plate. The glass plate is held against the bottom surface 31 of the horizontally extending arm 27 by spring contacts 38 and 39 which bear against the conductive coatings at the ends of the glass plate.

Mounted within the horizontally extending arm 27 of the support 26 is a suitable light sensor 45. The sensor is mounted in a recess 46 in the upper surface of the arm. A small diameter passage 47 extends from the recess 46 to an opening in the lower surface 31 of the arm. The pasage extends along a line from the light sensor 45 to the lamp 29 at the lower end of the vertically extending arm 28. Thus, the light sensor 45 is optically aligned with the lamp, and the beam of light from the lamp passes through the glass plate 35 and impinges on the sensor.

A second light sensor 50 is mounted on vertical surface 55 of the horizontal arm 27 in a block 51. The sensor 50 is positioned in a recess 52 in the block adjacent the first light sensor 45 and at substantially the same distance from the lamp 29 as the first sensor 45. The second light sensor 50 is optically aligned with the lamp 29 by means of a passage 53 extending through the block along the line between the sensor 50 and the lamp 29. The passage 53 terminates at an opening in a vertical face of the block, and a shielding portion 54 of the block extends below the opening in a horizontal direction without interfering with the optical alignment between the lamp and the second light sensor. The glass plate 35 does not extend beneath the block 51 nor across the beam of light passing from the lamp 29 to the second light sensor 50.

Electrical connections are made to the conductive regions 36 and 37 at the ends of the glass plate 35 by the spring contacts 38 and 39 which hold the glass plate in position. The contacts 38 and 39 are connected to lead wires 60 and 61 through terminals 62 and 63. These lead wires together with three lead wires 64, 65, and 66 from the two light sensors (the two sensors have one common connection and two lead wires 67 and 68 from the lamp pass to the exterior of the vacuum chamber to a power supply and indicating means 70.

A schematic diagram of the electrical circuit of the film monitoring apparatus of the invention is shown in FIG. 6. The electrical elements which are located within the vacuum chamber including the lamp 29, the first and second light sensors 45 and 50, the glass plate 35, and the electrical contacts 38 and 39 to the glass plate are encircled by a broken line 71.

The apparatus operates from a 110 volt, 60 cycle, AC power line. The lamp 29 is operated from a first transformer 72 and a full-wave rectifier 73 which provides 6.3 volts DC. The intensity of the light is controlled by a rheostat 74. A center-tapped second transformer 75, two full-wave rectifiers 76 and 77, and other components provide two separate 6.3 volt DC sources.

The two light sensors 45 and 50 together with a resistance 78 and a variable resistance 79 are connected to one of the DC sources and to an ammeter 80 in a bridge circuit arrangement by means of ganged switch 81. When the movable contacts of the switch contact the A terminals, the first light sensor 45 is connected to the DC source and to the ammeter 80 permitting this arm of the circuit to be checked. When the switch is connected to the B terminals, the second sensor 50 may be checked. With the switch 81 connected to the C terminals, the two sensors, the resistances 78 and 79 and the ammeter are arranged in a bridge circuit with the sensors in opposite arms.

The other DC source is connected to a voltage regulating network 83 including two transistors 84 and 85. The regulated voltage is connected to the contacts 38 and 39 holding the glass plate 35 in position in series with an ammeter 86.

In order to operate the measuring apparatus, a clean glass plate 35 having conductive material at the ends is placed in position between the resilient contacts 38 and 39. Light from the lamp 29 passes through the glass plate and impinges on the first light sensor 45. Light from the lamp impinges directly on the second light sensor 50.

The sensing head 25 is positioned in the vacuum chamber so that the lower surface of the glass plate 35 faces the containers 10 and 11 and is exposed to material emanating from the containers while material is being deposited on the substrate in the substrate holder 12. The surface of the glass plate is substantially normal to the path of material emanating from the containers. The light beams from the lamp 29 to the light sensors 45 and 50 are at an angle to the plane of the surface of the glass plate and at an angle to the path of material emanating from the containers. Thus, the lamp and the sensors are shielded from material and other radiation coming from the containers 10 and 11.

While material from a source in one of the containers 10 or 11 is being deposited onto the substrate in the substrate holder 12, a film of thickness proportional to the thickness of the film on the substrate is also being deposited on the glass plate 35 which serves as a pilot substrate. As material builds up on the surface of the glass plate the amount of light transmitted through the glass plate decreases. This decrease affects electrical characteristics of the first light sensor 45 unbalancing the bridge circuit and changing the ammeter reading. Because of the bridge circuit arrangement the ammeter provides a measure of the relative amount of light impinging on the two sensors, balancing out variations in the ambient light conditions and in the intensity of the light output from the lamp.

In addition, as material builds up on the lower surface of the glass plate 35, the resistance of the deposited film changes. Since the width and length of the non-conductive area on the surface of the glass plate have been established accurately, the electrical resistance between the two contacts 38 and 39 varies with the thickness of the film in a determinable proportion. The deposited film is connected in series with the ammeter 86 across a regulated voltage, and, therefore, the ammeter reading is a measure of the resistance of the deposited film.

While the material deposited on the glass plate is fairly thin, changes in film thickness produce changes in the light transmitted through the film and consequently in the readings of the first ammeter 80 which are significant to establish a correlation between meter reading and thickness and permit the film thickness to be determined with a satisfactory degree of accuracy. As the film becomes opaque, meter readings do not correlate with thickness sufficiently to provide an accurate determination of thickness. In addition, while the deposited material is relatively thin, the electrical resistance of the film is very high and readings of the second ammeter 86 do not correlate with film thickness to a satisfactory degree of accuracy. However, before the film becomes too thick to be accurately measured by the transmission of light therethrough, the electrical resistance decreases sufficiently so that readings of the second ammeter 86 permit determination of film thickness with a satisfactory degree of accuracy.

In one specific embodiment of the invention a General Electric type 222 incandescent lamp was employed as the light source 29. Texas Instrument type LS 400 phototransistors were employed as the light sensors 45 and 50. The transistors 84 and 85 employed in the regulated DC voltage source were Sylvania type SYL–1603 NPN power transistors. The ammeters 80 and 86 were Weston model 961 ammeters. The L-shaped support 26 of the sensing head 25 was fabricated of an epoxy resin and the lead wire insulation was either Teflon or an epoxy resin. The pilot substrate 35 was a flat glass plate and the dimensions of the non-conductive area of the lower surface were 25 by 75 millimeters.

Measuring apparatus according to the invention has been employed to monitor the deposition of thin films of various materials, such as, for example, chromium, gold, arsenic, tin, silver, aluminum, and nickel. Satisfactory correlation between film thickness and meter readings have been obtained over a range of film thicknesses on pilot substrates from about 200 angstrom units to about 50,000 angstrom units. Thickness was measured up to about 3,000 angstrom units by monitoring the light transmitted through the film. Beyond about 3,000 angstrom units thickness was determined by monitoring the electrical resistance of the film. Obviously the range of thicknesses of material deposited on the substrate in the substrate holder 12 which is determined by measuring the film deposited on the pilot substrate 35 can be varied by changing the ratio of the distances of the substrate and pilot substrate from the source 10 or 11 of material being deposited.

The apparatus has been found particularly useful in monitoring the deposition of two materials in succession. For example, a very thin film of material from a first source 10 is deposited, and while being deposited is monitored on the first ammeter 80. When a film of the desired thickness is obtained, material from the second source 11 is deposited over the first film. The meters are monitored until the second ammeter 86 provides the indication that the proper thickness has been attained. Consistent, reproducible runs are readily obtained and controlled in this manner, even though the two deposits have a wide variation in thickness.

While there has been shown and described what is considered a preferred embodiment of the present invention, it will be obvious to those skilled in the art that various changes and modifications may be made therein without departing from the invention as defined in the appended claims.

What is claimed is:

1. Apparatus for measuring the thickness of deposited films for use with deposition equipment in which material is transferred from a source of material and deposited on a substrate, said apparatus including in combination a transparent pilot substrate adapted to receive on one surface thereof material from the source of material, a source of radiant energy disposed on one side of the pilot substrate, means for sensing radiant energy disposed on the opposite side of the pilot substrate from the source of radiant energy to sense radiant energy passing through the pilot substrate from the source of radiant energy and for producing a signal indicative of the amount of radiant energy being sensed, spaced-apart electrical connections in contact with the one surface of the pilot substrate, first indicating means for producing an indication of the signal produced by the means for sensing radiant energy, and second indicating means for producing an indication of the electrical resistance between the spaced-part electrical connections.

2. Apparatus for determining the thickness of deposited films for use with equipment for depositing thin films of material on a substrate comprising a vacuum chamber, a support for supporting said substrate within said vacuum chamber, and a container adapted to hold material to be deposited on the substrate within said vacuum chamber; said apparatus including in combination a support adapted to be positioned within the vacuum chamber, a pilot substrate of a transparent non-conductive material mounted on said support and adapted to be positioned to receive on one surface thereof material emanating from the container while material emanating from the container is depositing on the substrate, a source of light mounted on said support on one side of said pilot substrate and arranged to direct light on the one surface of the pilot substrate, a light sensor mounted on said support on the opposite side of said pilot substrate and optically aligned with the source of light so that light from the source of light passes through the pilot substrate and impinges on the sensor, spaced-apart electrical connections in contact with the one surface of the pilot substrate, first indicating means connected to the light sensor and adapted to produce an indication of the amount of light impinging on the sensor, and second indicating means connected to the spaced-apart electrical connections and adapted to produce an indication of the electrical resistance between the connections.

3. Apparatus for determining the thickness of deposited films as in claim 2 including a second light sensor mounted on said support adjacent the first-mentioned light sensor and optically aligned with the source of light so that light from the source of light impinges on the second sensor without passing through the pilot substrate, and wherein said first indicating means includes circuit means connecting said light sensors in a bridge arrangement such that the first indicating means produces an indication of the amount of light impinging on one light sensor relative to the amount of light impinging on the other light sensor whereby variations in the light output of the source of light do not affect the indications produced by the first indicating means.

4. Apparatus for determining the thickness of deposited films for use with equipment for depositing thin films of material on a substrate comprising a vacuum chamber, a support for supporting said substrate within said vacuum chamber, and a container adapted to hold material to be deposited on the substrate within said vacuum chamber; said apparatus including in combination a support adapted to be positioned within the vacuum chamber including a first member extending generally transverse to the path of material emanating from the container and a second member extending generally toward the container from one end of the first member, the first member of the support having a flat surface facing the container and lying substantially normal to the path of material emanating from the container, a glass plate adapted to be mounted with one flat surface against the flat surface of the first member of the support whereby the opposite flat surface of the plate is in position to receive material emanating from the container, spaced-apart electrical connections mounted on the first member of the support and adapted to contact said opposite flat surface of the glass plate at opposite ends thereof, a source of light mounted on the second member of the support and arranged to direct light on said opposite flat surface of the glass plate mounted against the flat surface of the first member of the support, a shield disposed between the source of light and the container to prevent material emanating from the container from impinging on the source of light, a light sensor mounted within the first member of the support and spaced from said flat surface, a passage in said first member of the support extending from an opening in said flat surface of the first member to the light sensor to direct against the light sensor a beam of light radiating from the source of light at an angle to said opposite flat surface of the glass plate and at an angle to the path of material emanating from the container, first indicating means connected to the light sensor and adapted to produce an indication of the amount of light impinging on the sensor, and second indicating means connected to the spaced-apart electrical connections and adapted to produce an indication of the electrical resistance of material deposited on said opposite flat surface of the glass plate.

5. Apparatus for determining the thickness of deposited films as in claim 4 including a second light sensor mounted within a portion of the first member of the support adjacent the first-mentioned light sensor, said light sensors being located at substantially equal distances from the source of light, a second passage in said portion of the first member of the support extending from an opening in the portion of the first member to the second light sensor to direct against the second light sensor a beam of light radiating from the source of light at an angle to said opposite flat surface of the glass plate and at an angle to the path of material emanating from the container, said last-mentioned beam of light not passing through the glass plate, said portion of the first member of the support having an extension lying interposed between the container and the second passage to prevent material emanating from the container from impinging on the walls of the second passage or on the second light sensor, and wherein said first indicating means includes circuit means connecting said light sensors in a bridge arrangement such that the first indicating means produces an indication of the amount of light impinging on one light sensor relative to the amount of light impinging on the other light sensor whereby variations in the light output of the source of light do not affect the indications produced by the first indicating means.

References Cited
UNITED STATES PATENTS

| | | | |
|---|---|---|---|
| 2,771,055 | 11/1956 | Kelly et al. | 118—9 |
| 3,063,867 | 11/1962 | Emery | 118—9 X |
| 3,086,889 | 4/1963 | Strong | 118—8 X |

WALTER STOLWEIN, *Primary Examiner.*